INVENTORS
Heinz CASPAR
Felix KUDRITZKI
Horst ZIEGLER

INVENTORS
Heinz CASPAR
Felix KUDRITZKI
Horst ZIEGLER

INVENTORS
Heinz CASPAR
Felix KUDRITZKI
Horst ZIEGLER

United States Patent Office

3,492,872
Patented Feb. 3, 1970

3,492,872
APPARATUS FOR MEASURING A DIFFERENCE IN PRESSURE
Heinz Caspar, Felix Kudritzki, and Horst Ziegler, Berlin, Germany, assignors to Continental Elektroindustrie A.G. Asakania-Werke, Berlin-Mariendorf, Germany, a corporation of Germany
Filed Nov. 27, 1967, Ser. No. 685,929
Claims priority, application Germany, Nov. 26, 1966, C 40,809; Feb. 28, 1967, C 41,629; May 12, 1967, C 42,316
Int. Cl. G01l 7/08, 9/00, 7/00
U.S. Cl. 73—407
25 Claims

ABSTRACT OF THE DISCLOSURE

Three mutually spaced chambers are provided in a housing. Two of the chambers are coupled to sources of pressure to be measured, and the third chamber is completely filled with liquid. The first and second chambers are separated from the third chamber by flexible walls; a first flexible wall being provided between the first and third chambers and a second flexible wall being provided between the second and third chambers. The first and second walls are freely movable in determined directions and their positions relative to the housing are freely variable relative to each other under the influence of a variation in volume of the liquid in the third chamber. Each of the first and second walls is movable against restoration forces applied by springs. The walls are coupled to each other by a signal device which produces a signal indicating the difference in position between the walls relative to the housing and transfers the signal to an electrical measuring device which produces an electrical signal which varies with the difference in pressure of the sources of pressure. The third chamber is preferably divided into two parts coupled to each other by an aperture which throttles the flow of liquid between the two parts and thereby provides damping of the measurement. The apparatus of the present invention responds to a difference between the pressures upstream and downstream of an orifice, plate or nozzle in the pipe and measures fluid flow in terms of the square root of such difference in pressure.

DESCRIPTION OF THE INVENTION

The present invention relates to apparatus for measuring a difference in pressure. More particularly, the invention relates to apparatus for measuring a difference in pressure in a fluid or liquid in a pipe.

Known apparatus of the type of the present invention for measuring a difference in pressure permits hydrodynamic damping of the measuring apparatus with facility. This is accomplished by throttling the flow of liquid between the expnadable elastic containers of the apparatus. Such apparatus provides high operating safety and measures the flow of fluid or vapor through a pipe more or less satisfactorily. The accuracy of the measurement of the flow of fluid, although it may suffice for certain purposes, is not very good, however.

A disadvantage of known apparatus of the foregoing type is inaccuracy in measurement due to variation of the zero point, caused by the variation of the static pressures in the pressure chamber and variation of the liquid or fluid volume due to temperature changes. The foregoing variations subject the expandable elastic containers to nonelastic deformation which deformation causes the variation of the zero point. Furthermore, there may be undesirable hysteresis in components of the apparatus.

In an attempt to overcome the foregoing disadvantages, in one type of known apparatus, a flexible wall or diaphragm is provided for the liquid-filled expandable elastic container positioned in the pressure chamber. The resiliency or flexibility of the flexible wall or diaphragm is maintained small, so that the liquid in the pressure chamber may expand or contract without causing deformation of the expandable elastic container. This apparatus, however, provides inaccurate measurements, due to the resiliency or flexibility of the flexible wall. Furthermore, the zero point of such apparatus varies due to temperature variations.

The principal object of the present invention is to provide new and improved apparatus for measuring a difference in pressure. The apparatus of the present invention provides a pressure difference measurement with accuracy, efficiency, effectiveness and reliability. The apparatus of the present invention is of simple structure. The apparatus of the present invention is inexpensive and economical in operation and in manufacture. The apparatus of the present invention functions to provide accurate measurements which are not adversely affected by shock or vibration. The apparatus of the present invention functions to provide accurate measurements regardless of variations in the volume of liquid in the apparatus or in pressure or temperature.

In accordance with the present invention, apparatus for measuring a difference in pressure between sources of pressure comprises a housing. First and second pressure chambers in the housing are each connected to the sources of pressure. A third pressure chamber in the housing between the first and second pressure chambers is spaced therefrom and is completely filled with liquid. A first movable wall is provided between the first and third pressure chambers. A second movable wall is provided between the second and third pressure chambers. The first and second walls are freely movable in determined directions and their positions relative to each other are variable in accordance with variation in the volume of liquid in the third pressure chamber. First restoration springs couple the first movable wall to the housing for urging the first wall to a reference position. Second restoration springs couple the second movable wall to the housing for urging the second wall to a reference position. A partition arrangement divides the third pressure chamber into two parts each including a corresponding one of the first and second walls. The partition arrangement has an aperture arrangement formed therethrough for a throttled flow of liquid between the two parts. A signal device couples the first and second walls to each other and produces a signal indicating the difference in position between the walls relative to the housing. The signal device includes an electrical measuring device for producing an electrical signal corresponding to the first-mentioned signal and varying with the difference in pressure of the sources of pressure.

Further in accordance with the present invention, apparatus for measuring a difference in pressure comprises a first pressure chamber having a conduit for coupling to a pipe conducting a medium whose difference in pressure is to be measured. A second pressure chamber has a conduit for coupling to the pipe. A partition arrangement is interposed between and separates the first and second pressure chambers. The partition arrangement has an aperture formed therethrough. A first expandable elastic container in the first pressure chamber seals the first pressure chamber at the aperture through the partition arrangement and has a moveable part. A second expandable elastic container in the second pressure chamber seals the second pressure chamber at the aperture through the partition arrangement and has a movable part. A conduit is formed through the partition arrangement and extends from and opens into each of the first and second elastic containers. The first and second elastic containers are mounted in a manner whereby they are freely expandable and freely contractible in determined directions relative to each other and their movable parts are movable in determined directions relative to each other. A signal device provides an electrical signal corresponding to a difference in position between the first and second elastic containers. The signal device is mechanically coupled to the movable part of each of the first and second elastic containers whereby variation of pressure on one of the first and second elastic containers moves the signal device in accordance with the difference in pressure in the first and second pressure chambers. Movement of the signal device produces a corresponding electrical signal.

In most of the embodiments of the invention, the first and second elastic containers are mounted in a manner whereby they are freely expandable in directly opposite directions away from each other and freely contractible in directly opposite directions toward each other.

In one embodiment of the invention, the partition arrangement comprises a first partition having a first aperture formed therethrough and a second partition spaced from the first partition and having a second aperture formed therethrough. The first and second partitions form a third pressure chamber therebetween. The first partition separates the first and third pressure chambers and the first elastic container seals the first pressure chamber at the first aperture. The second partition separates the second and third pressure chambers and the second elastic container seals the second pressure chamber at the second aperture. The signal device comprises a winding support positioned in the third pressure chamber and having electrical windings mounted thereon. Electrical indicating means is connected to selected ones of the windings. Electrical energizing means is connected to selected others of the windings. A core has spaced opposite ends and is axially movably positioned in the winding support. A lever arm having a center and spaced opposite ends is pivotally mounted at its center at one end of the core. A first coupling rod is affixed to and extends between one end of the lever arm and the movable part of the first elastic container. A second coupling rod is affixed to and extends between the other end of the lever arm and the movable part of the second elastic container.

In another embodiment of the present invention, the signal device comprises a movable core having spaced opposite ends. A spring arrangement couples one end of the core to the first movable wall and couples the other end of the core to the second movable wall. An electrical winding arrangement is positioned in operative proximity with the core and produces an electrical signal which varies in accordance with the position of the core relative to the housing. The signal device is positioned in the third pressure chamber. In such other embodiment of the invention, the winding support is positioned in the third pressure chamber and springs couple one end of the core to the movable part of the first elastic container and couple the other end of the core to the movable part of the second elastic container. The springs of the signal device comprise a first spring having an end affixed to one end of the core and another end affixed to the movable part of the first elastic container and a second spring having one end affixed to the other end of the core and another end affixed to the movable part of the second elastic container. In this embodiment, a first coupling rod is affixed at one end to one end of the core. A first sealing member is mounted on the first coupling rod in the area of the other end thereof for sealing the first aperture in a determined position of the first coupling rod. A second coupling rod is affixed at one end to the other end of the core. A second sealing member is mounted on the second coupling rod in the area of the other end thereof for sealing the second aperture in a determined position of the second coupling rod. The first spring has one end affixed to the other end of the first coupling rod and another end affixed to the movable part of the first elastic container. The second spring has one end affixed to the other end of the second coupling rod and another end affixed to the movable part of the second elastic container.

In the other three embodiments of the present invention, the signal device comprises a first movable core affixed to the first movable wall. A second movable core is affixed to the second movable wall. First electrical windings are positioned in operative proximity with the first core for producing a first electrical signal which varies in accordance with the position of the first core relative to the housing. Second electrical windings are positioned in operative proximity with the second core for producing a second electrical signal which varies in accordance with the position of the second core relative to the housing. An electrical device is electrically connected to the first and second windings and produces an electrical signal which varies in accordance with the difference between the first and second electrical signals.

In another embodiment of the invention, the partition arrangement comprises a first partition having a first aperture formed therethrough and a second partition spaced from the first partition and having a second aperture formed therethrough. The first elastic container seals the first pressure chamber at the first aperture and the second elastic container seals the second pressure chamber at the second aperture. The signal device comprises linearly transmitting differential transformers for providing electrical signals in accordance with the movement of the movable parts of the first and second elastic containers. The transformers are mechanically coupled to the movable parts of the first and second elastic containers. The transformers comprise a first linearly transmitting differential transformer mechanically coupled to the movable part of the first elastic container and positioned in the first elastic container and a second linearly transmitting differential transformer mechanically coupled to the movable part of the second elastic container and positioned in the second elastic container. A conduit is provided between the first and second apertures of the first and second partitions. Blocking means mechanically coupled to the movable parts of the first and second elastic containers blocks the conduit to prevent the passage of fluid between the first and second apertures in accordance with the movement of the movable parts of the first and second elastic containers. A flow-control device in the conduit controls the flow of fluid between the first and second elastic containers. In this embodiment, the signal device comprises a first winding support positioned in the first elastic container and having electrical windings mounted thereon. A second winding support is positioned in the second elastic container and has electrical windings mounted thereon. Electrical indicating means is connected to selected ones of the windings. Electrical energizing means is connected to selected others of the windings. A first core has spaced opposite ends and is axially movably positioned in the first winding support and is affixed at one end to the movable part of the first elastic container. A second core has spaced opposite ends and is axially movably positioned in the second winding support and is affixed at one end to the movable part of the second elastic container. The first and second cores are spaced from each other. A third partition has a third aperture formed therethrough and is positioned intermediate and spaced from the first and second partitions. A conduit directs a fluid from one of the first and second elastic containers to the other through the first, second and third apertures. The flow control device is in the third aperture for controlling the cross-sectional area of and therefore the flow of fluid through the third aperture. A first spring has one end affixed to the other end of the first core and another end. A first sealing member is mounted on the first spring at the other end thereof for sealing one opening of the third aperture in a determined position of the first core. A second spring has one end affixed to the other end of the second core and another end. A second sealing member is mounted on the second spring at the other end thereof for sealing the other aperture in a determined position of the second core. The flow control includes a manually operable control member extending through a housing enclosing the apparatus, to outside such housing.

In another embodiment of the invention, the first and second elastic containers are mounted in a manner whereby they are freely expandable in the same direction and freely contractible in the same direction. The first and second elastic containers are mounted in parallel spaced relation. A common base plate has a conduit formed therein for directing a fluid from one of the first and second elastic containers to the other. The conduit has a first aperture at one end thereof and a second aperture at the other end thereof. The first elastic container seals the first pressure chamber at the first aperture and the second elastic container seals the second pressure chamber at the second aperture. A flow control device in the conduit controls the flow of fluid between the first and second elastic containers. Blocking means mechanically coupled to the movable parts of the first and second elastic containers blocks the conduit to prevent the passage of fluid between the first and second elastic containers in accordance with the movement of the movable parts of the first and second elastic containers.

In still another embodiment of the present invention, the first and second elastic containers are diaphragms mounted in a manner whereby they are freely expandable in directly opposite directions away from each other and freely contractible in directly opposite directions toward each other. In this embodiment, a third pressure chamber is intermediate and spaced from the diaphragms and a third diaphragm is positioned in the third pressure chamber parallel to and spaced substantially equidistantly from the first-mentioned diaphragms.

In order that the present invention may be readily carried into effect, it will now be described with reference to the accompanying drawings, wherein.

Figure 1:
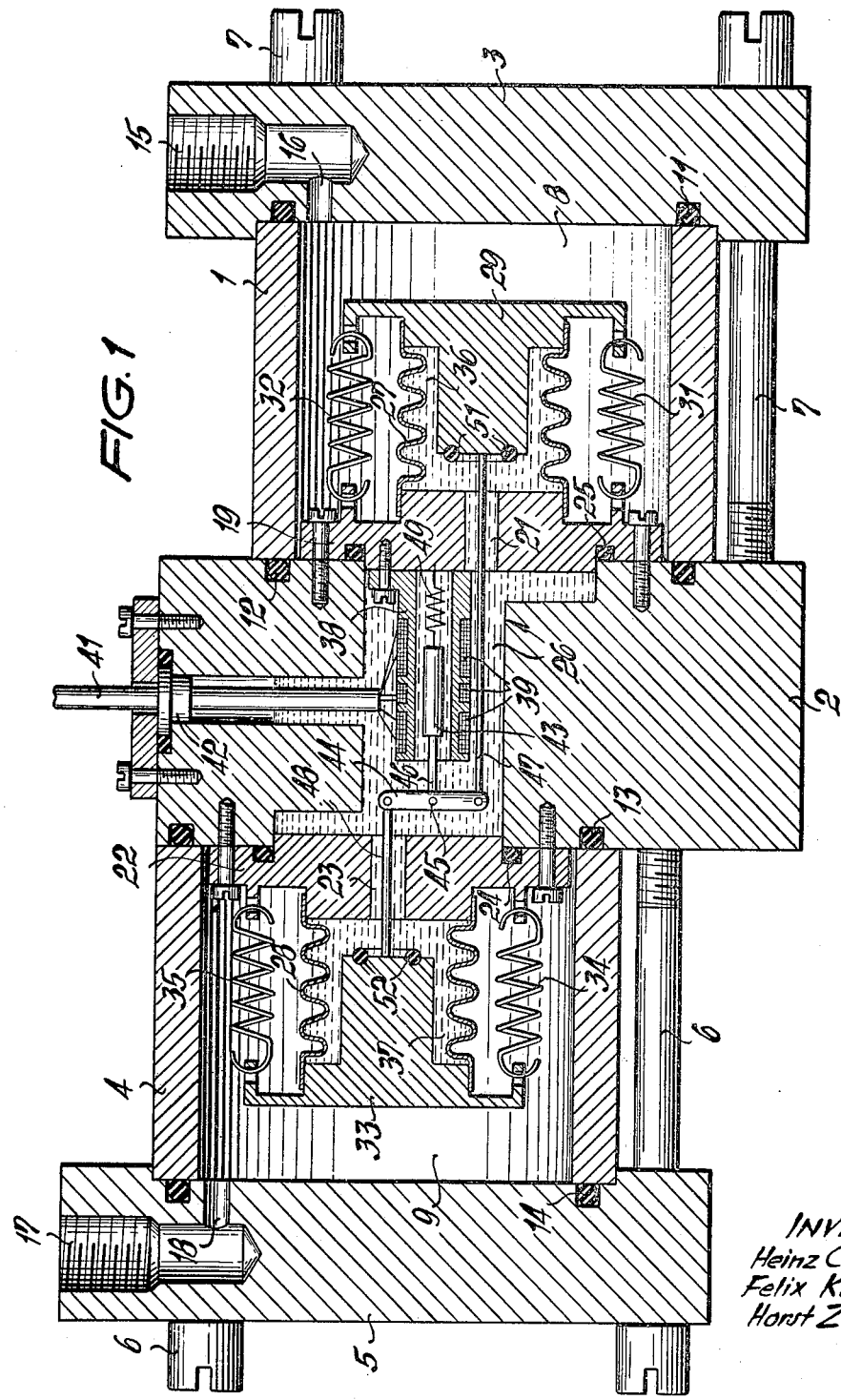
FIG. 1 is a view, partly in section, of a first embodiment of the apparatus of the present invention.

In the figures the components are identified by different reference numerals, since each of FIGS. 1 to 5 illustrates a different embodiment, of the present invention. The same component of the apparatus, since it appears in different figures, is thus identified by different reference numerals.

In the first embodiment of the present invention, as shown in FIG. 1, a first housing portion 1 of substantially hollow cylindrical configuration is closed at one end by a first block type housing portion 2 and at the other end by a second block type housing portion 3. A second substantially hollow cylindrical housing portion 4 is closed at one end by the first block type housing portion 2 and at the other end by a third block type housing portion 5. The first and second cylindrical housing portions 1 and 4 are maintained in pressure-tight position between the first, second and third block type housing portions 2, 3 and 5 by a plurality of threaded rods or bolts, of which two bolts 6 and 7 are shown in FIG. 1.

The housing portions 1, 2 and 3 form a first pressure chamber 8. The housing portions 2, 4 and 5 form a second pressure chamber 9. A pair of sealing rings 11 and 12, comprising any suitable sealing material such as, for example, rubber, seal the first pressure chamber 8 and make it pressure-tight. A pair of sealing rings 13 and 14, of any suitable sealing material such as, for example, rubber, seal the second pressure chamber 9 and make it pressure-tight. A conduit 15, 16 couples the first pressure chamber 8 to a pipe (not shown in the figures) conducting a medium such as, for example, a liquid or water, whose difference in pressure is to be measured. A conduit 17, 18 couples the second pressure chamber 9 to the pipe (not shown in the figures).

A first partition 19, having a first aperture 21 formed therethrough, is interposed between and separates the first and second pressure chambers 8 and 9, since it is affixed to the housing portion 2. A second partition 22, having a second aperture 23 formed therethrough, is positioned substantially parallel to and spaced from the first partition 19. The second partition 22 thus is also interposed between and separates the first and second pressure chambers 8 and 9, since it is affixed to the housing portion 2. Each of the first and second partitions 19 and 22 is affixed to the housing portion 2 by any suitable means such as, for example, bolts, as shown in FIG. 1.

The first and second partitions 19 and 22 are affixed to the second housing portion 2 in a pressure-tight manner due to a pair of sealing rings 24 and 25, and said partitions therefore form a third pressure chamber 26 between them. A first expandable elastic container 27 in the first pressure chamber 8 seals said first pressure chamber at the first aperture 21. A second expandable elastic container 28 in the second pressure chamber 9 seals said second pressure chamber at the second aperture 23. Each of the first and second expandable elastic containers 27 and 28 may comprise any suitable expandable elastic, flexible, yieldable or foldable means or housing such as, for example, a bellows, an accordion type housing, a diaphragm, corrugated tubing of metal or softer material, or the like.

In the first embodiment of FIG. 1 of the present invention, the first partion 19 separates the first and third pressure chambers 8 and 26 and the second partition 22 separates the second and third pressure chambers 9 and 26. The first elastic container 27 has a movable part, wall or head 29 which is continually urged toward the first partition 19 by a plurality of restoration springs, of which two springs 31 and 32 are shown in FIG. 1. Each of the springs is affixed to the head 29 at one end in a bore provided therefor on said head and is affixed at its other end to the first partition 19 in a bore provided therefor on said partition. The second elastic container 28 has a movable part, wall or head 33 which is continually urged toward the second partition 22 by a plurality of restoration springs, of which two springs 34 and 35 are shown in FIG. 1. Each of the springs is affixed to the head 33 at one end in a bore provided therefor on said head and is affixed at its other end to the second partition 22 by a bore provided therefor on said partition.

A liquid passage through the third pressure chamber 26 extends from and opens into each of the first and second apertures 21 and 23 and directs the passage of liquid from either of the first and second elastic containers 26 and 28 to the other. The liquid passage functions to throttle the flow of liquid between the first and second elastic containers. The first and second elastic containers 27 and 28 are thus mounted in a manner whereby they are freely expandable in directly opposite directions away from each other and freely contractible in directly opposite directions toward each other. The resiliency, flexibility, or spring constant of the first expandable elastic container 27 is small relative to the spring constant or force exerted by the restoration springs, which force urges its wall or head 29 toward the first partition 19. The resiliency, flexibility or spring constant of the second expandable elastic container 28 is small relative to the spring constant or force exerted by the restoration springs, which force urges its wall or head 33 toward the second partition 22. The resiliency, flaxibility or elasticity of the expandable elastic containers 27 and 28 is determined to a considerable extent by the material of which said containers are made.

Each of the first and second expandable elastic containers 27 and 28 is pressure-sealed by any suitable means such as, for example, soldering, welding, pressure seals, or the like, at its head 29 and 33, respectively, and at the first and second partitions 19 and 22, respectively. The third pressure chamber 26 and the first and second elastic containers 27 and 28 are completely filled with a liquid of minimum compressibility. A suitable liquid having minimum compressibility is oil, such as, for example, silicon oil. Each of the first and second elastic containers 27 and 28 is so designed that the volume of liquid therein, particularly in the areas 36 and 37, respectively, thereof, is maintained at a minimum. The liquid in the areas 36 and 37 of the first and second elastic containers 27 and 28, respectively, is maintained at a minimum in order to maintain volume changes in such liquid at a minimum thereby maintaining errors at a minimum, since the errors are proportional to variations in the volume of the liquid.

Figure 6:
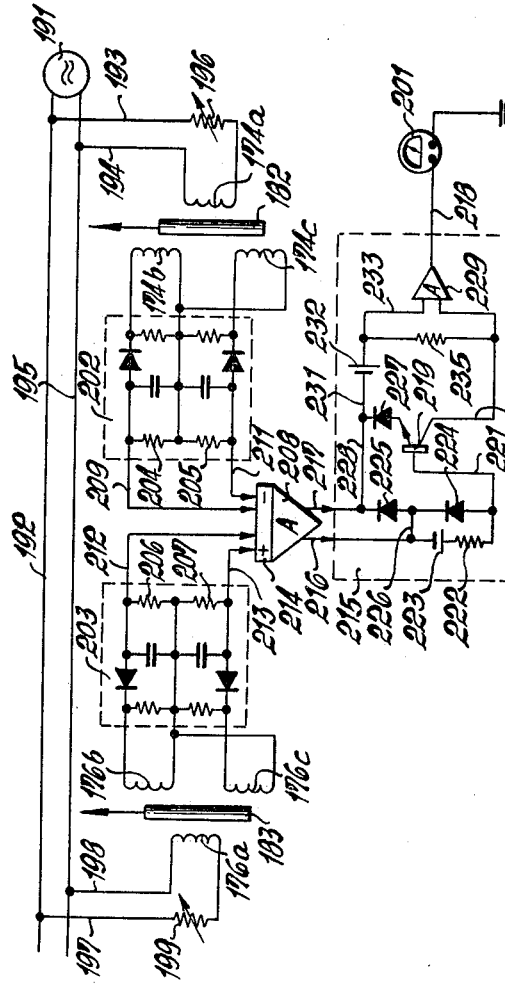
FIG. 6 is a circuit diagram of a signal device which may be utilized with the apparatus of the present invention.
Figure 7:
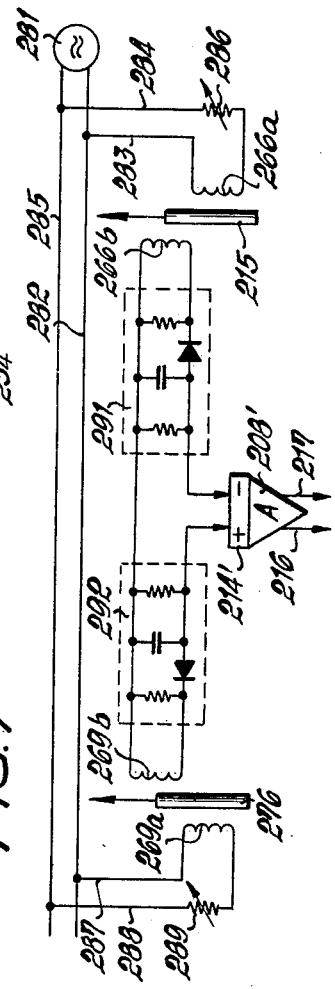
FIG. 7 is a circuit diagram of a modification of the signal device of FIG. 6 which may be utilized with the apparatus of the present invention.

A signal device provides electrical signals corresponding to a difference in pressure between the first and second pressure chambers 8 and 9. The signal device comprises a widening support 38 positioned in the third pressure chamber 26. A plurality of electrical windings 39 are mounted on the winding support 38. As shown in FIG. 1, the leads or terminals of the electrical windings 39 are combined in the single cable 41 which is passed through the housing portion 2 to outside said housing portion via a pressure-tight seal 42. As shown in FIGS. 6 and 7, and as described with reference thereto, an electrical indicator is connected to selected ones of the electrical windings 39 of the winding support 38 and a source of electrical energy is connected to selected others of said electrical windings.

A core 43 is axially movably positioned in the winding support 38. The core 43 has spaced opposite ends. A lever arm 44 has a center and spaced opposite ends. The lever arm 44 is pivotally mounted by any suitable pivot means 45 such as, for example, a pivot pin, at its center at one end of the core 43 by means of a connecting rod 46. A first coupling rod 47 is affixed to and extends between the lower end of the lever arm 44 and the movable part 29 of the first elastic container 27. A second coupling rod 48 is affixed to and extends between the upper end of the lever arm 44 and the movable part 33 of the second elastic container 28.

The first coupling rod 47 extends through the first aperture 21 formed in the first partition 19. The second coupling rod 48 extends through the second aperture 23 formed in the second partition 22. The core 43 comprises a ferromagnetic material. The other end of the core 43 is coupled to the first partition 19 via a spring 49. The heads 29 and 33 of the first and second elastic containers 27 and 28 are freely movable in directions toward and away from each other. Thus, for example, if the volume of liquid in the first and second elastic containers 27 and 28 expands, the heads 29 and 33 thereof move in directions away from each other and toward the housing portions 3 and 5, respectively. Such movement of the heads 29 and 33 rotates the lever arm 48 in a counterclockwise direction about its pivot point 45. The core 43 is not moved under these circumstances. In the opposite situation, in which the heads 29 and 33 move toward each other and away from the housing portions 3 and 5, due to a decrease in volume of the liquid in the first and second elastic containers 27 and 28, the lever arm 44 is rotated in a clockwise direction about its pivot point 45 and the core 43 is not moved.

The core 43, the winding support 38 and the electrical windings 39 together function as a linearly transmitting differential transformer to produce in the leads of the cable 41 an alternating voltage electrical signal having an amplitude which is proportional to the position of said core in said winding support. The first and second elastic containers 27 and 28 as well as their retaining springs 31, 32 and 34, 35, are dimensioned and selected in a manner whereby the heads 29 and 33, respectively, of said first and second elastic containers move equal distances under equal pressures.

A sealing ring 51 is provided in the surface of the head 29 around the first coupling rod 47 and has a diameter larger than that of the first aperture 21. A sealing ring 52 is provided in the surface of the head 33 around the second coupling rod 48 and has a diameter larger than that of the second aperture 23. Each of the seals 51 and 52, as do the other sealing rings or seals of the apparatus, comprises any suitable sealing material such as, for example, rubber.

When the pressure in the first and second pressure chambers 8 and 9 is extremely great, so that the heads 29 and 33 are moved towards each other to the extent that they contact the first and second partitions 19 and 22, the sealing rings 51 and 52 function to cut off the flow of liquid from one of the first and second elastic containers 27 and 28 to the other. The sealing rings 51 and 52 thus function as a safety device in the event of excess pressure and prevent the damage or destruction of either or both of the sensitive first and second elastic containers 27 and 28 when the pressure in either or both of the first and second pressure chambers 8 and 9 becomes excessive.

When the pressure in one of the first and second pressure chambers 8 and 9 becomes excessive, one of the seals 51 and 52 closes the corresponding one of the first and second apertures 21 and 23, thereby preventing the flow of liquid from the corresponding one of the elastic containers to the other. This causes the pressure of the liquid in the corresponding elastic container to increase in proportion to the pressure of the liquid in the pressure chamber in which such elastic container is positioned, thereby preventing non-elastic deformation of said elastic container.

The first embodiment of the present invention, as shown in FIG. 1, functions in the following manner. When the first expandable elastic container 27 and the second expandable elastic container 28 are in their rest or zero positions, there is an electrical signal provided in the leads of the cable 41 extending from the differential transformer 38, 39, 43. In the rest position, the pressures of the first and second pressure chambers 8 and 9 are equal. If variations in pressure in the first and second pressure chambers 8 and 9 are the same, the liquid in the corresponding first and second expandable elastic containers 27 and 28 is compressed or expanded to the same extent. If the temperature varies, the volume of the liquid in the first and second expandable elastic containers 27 and 28 varies.

Under the foregoing conditions, when the pressure and/or temperature variations in both the first and second pressure chambers 8 and 9 are the same, both heads 29 and 33 will move equal distances either towards each other or away from each other and the lever arm 44 will rotate, in the aforedescribed manner, without affecting movement of the core 43. When the pressure in one of the first and second pressure chambers 8 and 9 varies to a different extent than that in the other of said pressure chambers, the heads 29 and 33 are both moved in the same direction, so that the lever arm 44 is moved in such direction with them. The movement of the lever arm 44 as a unit will be either in the direction of the force exerted by the spring 49 or in the opposite direction. In either event, the heads 29 and 33 move the lever arm 44, as a unit, without rotation, in the direction in which they themselves are moved. Under such circumstances, an alternating electrical signal is provided in the windings 39 and is transmitted via the leads of the cable 41. The alternating electrical signal thus produced by the differential transformer 38, 39, 43 is proportional in amplitude to the difference in pressure between the first and second pressure chambers 8 and 9.

During the movement of the heads 29 and 33 the liquid in the first and second elastic containers 27 and 28 flows, at a throttled, restricted, or reduced rate, from one of said elastic containers to the other via the first and second apertures 21 and 23 and the liquid passage between said apertures. The apparatus is thereby provided with appropriate damping.

The indication of the difference in pressure between the first and second pressure chambers 8 and 9, which indication is provided by an electrical indicator (FIGS. 6 and 7 which indicates the magnitude of the electrical signal in the leads of the cable 41, is independent of the pressure P0 of the liquid in the first and second elastic containers 27 and 28. This is the case when the elastic containers 27 and 28 and the resiliency or spring constants of the restoration springs affixed to their corresponding heads 29 and 33, respectively, are suitably adjusted to each other.

(1)
$$X1 - X2 = \frac{F2}{CC2}(P2) - \frac{F1}{CC1}(P1)$$
$$+ \frac{1}{CC1}(F1P0 + AA1) - \frac{1}{CC2}(F2P0 + AA2)$$

wherein P1 is the pressure in the first pressure chamber 8, P2 is the pressure in the second pressure chamber 9, F1 is the pressure-subjected area of the first expanded elastic container 27, F2 is the pressure-subjected area of the second expandable container 28, C1 is the resiliency or spring constant of each of the plurality of springs of which the springs 31 and 32 are shown in FIG. 1, C2 is the resiliency or spring constant of each of the plurality of springs of which the springs 34 and 35 are shown in FIG. 1, C11 is the resiliency or spring constant of the first elastic container 27, C22 is the resiliency or spring constant of the second elastic container 28, X1 is the length of the first elastic container from the first partition 19, X2 is the length of the second elastic container 28 from the second partition 22, and (2)  $C1 + C11 = CC1$
     $C2 + C22 = CC2$
and (3)  $C1A1 + C11A11 = AA1$
     $C2A2 + C22A22 = AA2$ the terms A1, A2, A11, A22, AA1 and AA2 being forces.

The resultant sums of Equation 3 indicate the forces to which the first and second elastic containers 27 and 28 are subjected when they are in their zero or rest positions.

From Equation 1, it is determined that (4)  $\Delta X = X1 - X2 = \Delta P = P2 - P1$ so that
$$\frac{\partial \Delta X}{\partial P0} = 0$$

provided that (5)  $$\frac{F2}{CC2} = \frac{F1}{CC1}$$

is selected.

The first and second expandable elastic containers 27 and 28 are thus provided with predetermined pressure-subjected or effective areas F1 and F2, respectively, in which they are subjected to forces, and the resiliency or spring constants CC1 and CC2 of the restoration springs which are affixed to their heads 29 and 33, respectively, are selected to correct any possible deviation of such effective or pressure-subjected areas.

Figure 2:
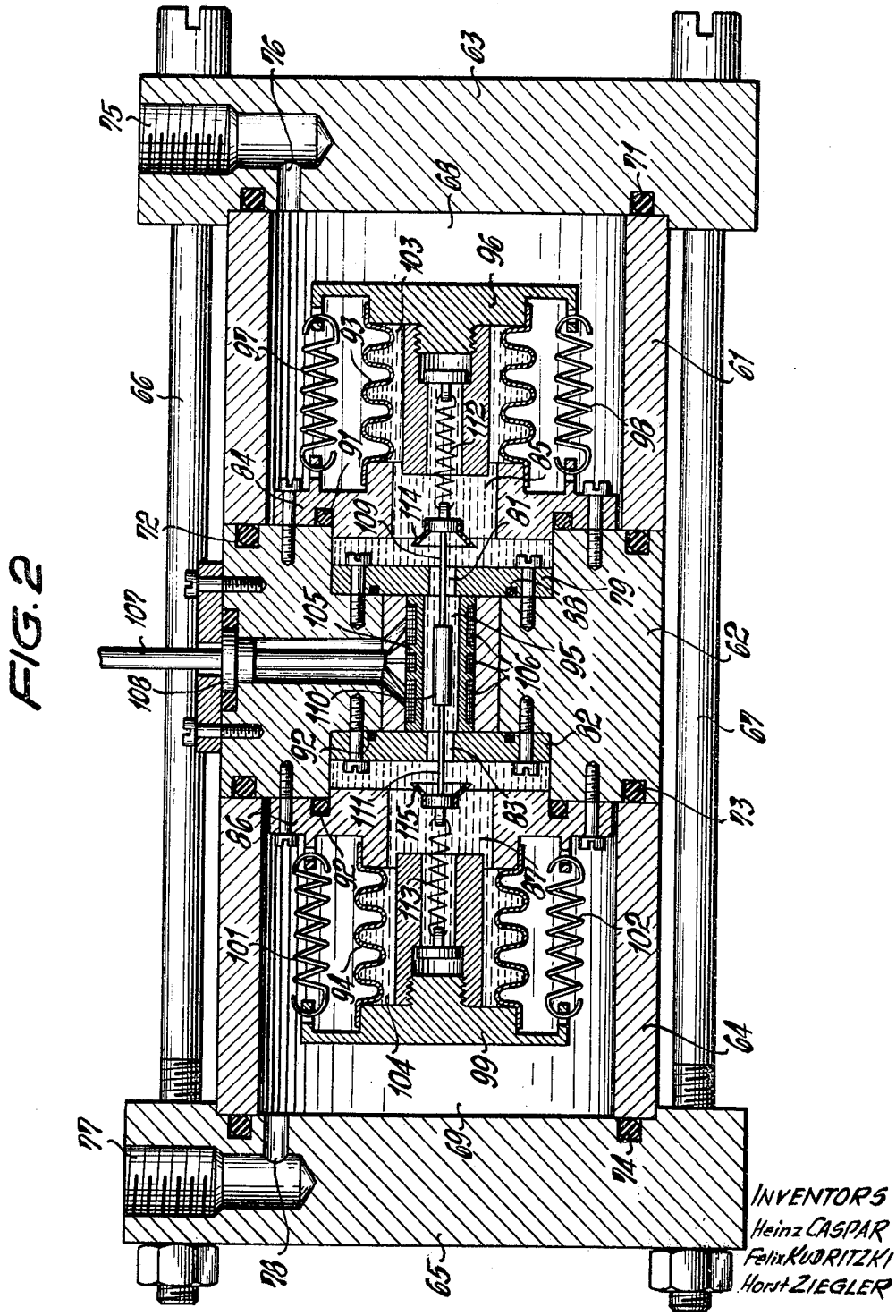
FIG. 2 is a view, partly in section, of a second embodiment of the apparatus of the present invention.

In the second embodiment of the present invention, as shown in FIG. 2, a first housing portion 61 of substantially hollow cylindrical configuration is closed at one end by a first block type housing portion 62 and at the other end by a second block type housing portion 63. A second substantially hollow cylindrical housing portion 64 is closed at one end by the first block type housing portion 62 and at the other end by a third block type housing portion 65. The first and second cylindrical housing portions 61 and 64 are maintained in pressure-tight position between the first, second and third block type housing portions 62, 63 and 64 by a plurality of threaded rods or bolts, of which two bolts 66 and 67 are shown in FIG. 2.

The housing portions 61, 62 and 63 form a first pressure chamber 68. The housing portions 62, 64 and 65 form a second pressure chamber 69. A pair of sealing rings 71 and 72, comprising any suitable sealing material such as, for example, rubber, seal the first pressure chamber 68 and make it pressure-tight. A pair of sealing rings 73 and 74, of any suitable sealing material such as, for example, rubber, seal the second pressure chamber 69 and make it pressure-tight. A conduit 75, 76 couples the first pressure chamber 68 to a pipe (not shown in the figures) conducting a medium such as, for example, a liquid or water, whose difference in pressure is to be measured. A conduit 77, 78 couples the second pressure chamber 69 to the pipe (not shown in the figures).

A first partition 79, having a first aperture 81 formed therethrough, is interposed between and separates the first and second pressure chambers 68 and 69, since it is affixed to the housing portion 62. A second partition 82, having a second aperture 83 formed therethrough, is positioned substantially parallel to and spaced from the first partition 79. The second partition 82 is thus also interposed between and separates the first and second pressure chambers 68 and 69, since it is affixed to the housing portion 62. Each of the first and second partitions 79 and 82 is affixed to the housing portion 62 by any suitable means such as, for example, bolts, as shown in FIG. 2.

A third partition 84, having a third aperture 85 formed therethrough, is affixed to the housing portion 62 by any suitable means such as, for example, bolts, as shown in FIG. 2. A fourth partition 86, having a fourth aperture 87 formed therethrough, is affixed to the housing portion 62 by any suitable means such as, for example, bolts, as shown in FIG. 2. The first, second, third and fourth partitions 79, 82, 84 and 86 are positioned in parallel spaced relation with each other, with said first and second partitions being spaced a determined distance from each other and with said third and fourth partitions being spaced a distance from each other which is greater than such determined distance.

The first, second, third and fourth partitions 79, 82, 84 and 86 are affixed to the second housing portion 62 in a pressure-tight manner due to sealing rings 88, 89, 91 and 92. A first expandable elastic container 93 in the first pressure chamber 68 seals said first pressure chamber at the first and third apertures 81 and 85. A second expandable elastic container 94 in the second pressure chamber 69 seals said second pressure chamber at the second and fourth apertures 82 and 87. The first and second elastic containers 93 and 94 are of essentially the same configuration and of the same material as the first and second elastic containers 27 and 28 of FIG. 1.

In the second embodiment of FIG. 2, the first and second partitions 79 and 82 form a third pressure chamber 95 between them. The first partition 79 separates the first and third pressure chambers 68 and 95 and the second partition 82 separates the second and third pressure chambers 69 and 95. The first elastic container 93 has a movable part, wall or head 96 which is continually urged toward the first and third partitions 79 and 84 by a plurality of restoration springs, of which two springs 97 and 98 are shown in FIG. 2. Each of the restoration springs is affixed to the head 96 at one end in a bore provided therefor on said head and is affixed at its other end to the third partition 84 in a bore provided therefor on said partition. The second elastic container 94 has a movable part, wall or head 99 which is continually urged toward the second and fourth partitions 82 and 86 by a plurality of restoration springs, of which two springs 101 and 102 are shown in FIG. 2. Each of the restoration springs is affixed to the head 99 at one end in a bore provided therefor on said head and is affixed at its other end to the fourth partition 86 by a bore provided therefor on said partition.

A liquid passage of the same type as that of the first embodiment of FIG. 1 is provided through the third pressure chamber 95 and functions to throttle the flow of liquid between the first and second elastic containers. The first and second elastic containers 93 and 94 are thus maintained in a manner whereby they are freely expandable in directly opposite directions away from each other and freely contractible in directly opposite directions toward each other. The relations of the resiliency, flexibility or spring constants of the first and second expandable elastic containers 93 and 94 and of the restoration springs which retain the corresponding heads 96 and 99, respectively, in position, are the same as those of the first embodiment of FIG. 1.

Each of the first and second expandable elastic containers 93 and 94 is pressure-sealed in the same manner as in FIG. 1. The first and second elastic containers 93 and 94 are completely filled with a liquid of minimum compressibility, as in the first embodiment of FIG. 1. As in the first embodiment of FIG. 1, each of the first and second elastic containers 93 and 94 is so designed that the volume of liquid therein, particularly in the areas 103 and 104 thereof, respectvely, is maintained at a minimum, for the same reason as in FIG. 1. The third pressure chamber 95 is also completely filled with the liquid which fills the first and second elastic containers 93 and 94.

The signal device comprises a winding support 105 positioned in the third pressure chamber 95. A plurality of electrical windings 106 are mounted on the winding support 105. The leads or terminals of the electrical windings 106 are combined in a single cable 107 which is passed through the housing portion 62 via a pressure-tight seal 108'. An electrical indicator and a source of electrical energy (not shown in FIG. 2, but shown in FIG. 6) are connected to selected electrical windings, as in the first embodiment of FIG. 1.

A core 108 is axially movably positioned in the winding support 105. The core 108 has spaced opposite ends. A first coupling rod 109 is affixed at one end to one end of the core 108. A second coupling rod 111 is affixed at one end to the other end of the core 108. A first spring 112 has one end affixed to the other end of the first coupling rod 109 and another end affixed to the movable part 96 of the first elastic container 93. A second spring 113 has one end affixed to the other end of the second coupling rod 111 and another end affixed to the movable part 99 of the second elastic container 94.

A first sealing member 114 is mounted on the first coupling rod 109 in the area of the end thereof which is affixed to the first spring 112. The first sealing member 114 seals the first aperture 81 in a determined position of the first coupling rod 109. A second sealing member 115 is mounted on the second coupling rod 111 in the area of the end thereof which is affixed to the second spring 113. The second sealing member 115 seals the second aperture 83 in a determined position of the second coupling rod 111.

In the second embodiment of FIG. 2, the first and second elastic containers 93 and 94 move in the same manner as the first and second elastic containers of the first embodiment of FIG. 1. In the second embodiment of FIG. 2, however, the core 108 is mechanically coupled to the heads 96 and 99. The first and second sealing members 114 and 115 of FIG. 2 function in the same manner as the sealing rings 51 and 52 of the first embodiment of FIG. 1, to prevent excessive pressure in either of the first and second pressure chambers 68 and 69 from damaging or destroying the corresponding first and second elastic containers 93 and 94, by sealing the first and second apertures 81 and 83, respectively.

The second embodiment of FIG. 2 functions in the same manner as the embodiment of FIG. 1. Thus, variations in volume in the liquid in the first and second elastic containers 93 and 94 cause corresponding movement of the heads 96 and 99 in the same manner as in the first embodiment of FIG. 1. The movements of the heads 96 and 99 are balanced with each other by the first and second springs 112 and 113 when said heads move in opposite directions toward each other or away from each other. When there is a pressure difference between the first and second pressure chambers 68 and 69, however, both heads 96 and 99 move in the same direction, so that the core 108 is moved correspondingly, as in FIG. 1.

The electrical signal provided in the leads of the cable 107, as a result of a pressure difference in the first and second pressure chambers 68 and 69, is the same as in the first embodiment of FIG. 1.

Figure 3:
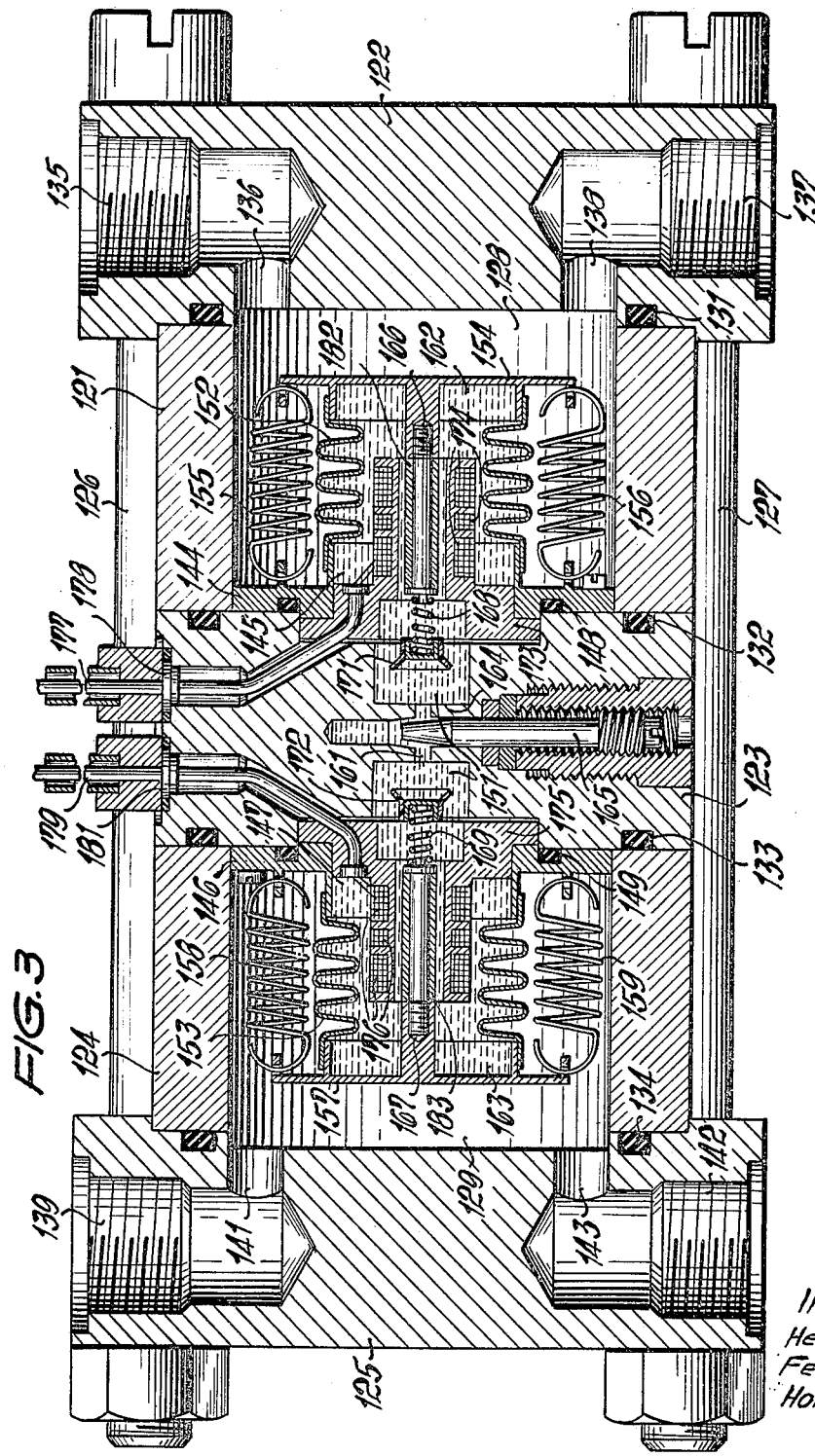
FIG. 3 is a view, partly in section, of a third embodiment of the apparatus of the present invention.

In the third embodiment of the present invention, as shown in FIG. 3, a first housing portion 121 of substantially hollow cylindrical configuration is closed at one end by a first block type housing portion 122 and at the other end by a second block type housing portion 123. A second substantially cylindrical housing portion 124 is closed at one end by the second block type housing portion 123 and at the other end by a third block type housing portion 125. The first and second cylindrical housing portions 121 and 124 are maintained in pressure-tight position between the first, second and third block type housing portions 122, 123 and 125 by a plurality of threaded rods or bolts, of which two bolts 126 and 127 are shown in FIG. 3.

The housing portions 121, 122 and 123 form a first pressure chamber 128. The housing portions 123, 125 and 124 form a second pressure chamber 129. A pair of sealing rings 131 and 132, comprising any suitable sealing material, seal the first pressure chamber 128 and make it pressure-tight. A pair of sealing rings 133 and 134, of any suitable sealing material, seal the second pressure chamber 129 and make it pressure-tight. Conduits 135, 136 and 137, 138 couple the first pressure chamber 128 to a pipe (not shown in the figures) conducting the liquid whose difference in pressure is to be measured. Conduits 139, 141 and 142, 143 couple the second pressure chamber 129 to the pipe (not shown in the figures).

A first partition 144, having a first axial aperture 145 formed therethrough, is interposed between and separates the first and second pressure chambers 128 and 129, since it is affixed to the housing portion 123. A second partition 146, having a second axial aperture 147 formed therethrough, is positioned substantially parallel to and spaced from the first partition 144. The second partition 146 thus is also interposed between and separates the first and second pressure chambers 128 and 129, since it is affixed to the housing portion 123. Each of the first and second partitions 144 and 146 is affixed to the housing portion 123 by any suitable means such as, for example, bolts, as shown in FIG. 3.

The first and second partitions 144 and 146 are affixed to the second housing portion 123 in a pressure-tight manner due to a pair of sealing rings 148 and 149 and said partitions therefore form a third pressure chamber 151 between them. A first expandable elastic container 152 in the first pressure chamber 128 seals said first pressure chamber at the first aperture 145. A second expandable elastic container 153 in the second pressure chamber 129 seals said second pressure chamber at the second aperture 147. Each of the first and second expandable elastic containers 152 and 153 is of essentially the same configuration as, and is of essentially the same material as, the expandable elastic container of the first and second embodiments of FIGS. 1 and 2.

The first elastic container 152 has a movable part, wall or head 154 which is continually urged towards the first partition 144 by a plurality of restoration springs, of which two springs 155 and 156 are shown in FIG. 3. Each of the restoration springs is affixed to the head 154 at one end in a bore provided therefor on said head and is affixed at its other end to the first partition 144 in a bore provided therefor on said partition. The second elastic container 153 has a movable part, wall or head 157 which is continually urged towards the second partition 146 by a plurality of restoration springs, of which two springs 158 and 159 are shown in FIG. 3. Each of the restoration springs is affixed to the head 157 at one end in a bore provided therefor on said head and is affixed at its other end to the second partition 146 by a bore provided therefor on said partition.

A liquid passage 161 extends through the third pressure chamber 151 and opens into each of the first and second elastic containers 152 and 153. The liquid passage 161 directs the passage of liquid from either of the first and second elastic containers 152 and 153 to the other, and functions to throttle the flow of liquid between said first and second elastic containers. The first and second elastic containers 152 and 153 are mounted in a manner similar to their mounting in the first and second embodiments of FIGS. 1 and 2, and they are adjusted, as are their head retaining springs, in a similar manner as in said embodiments of FIGS. 1 and 2, so that they function and move similarly as in said embodiments of FIGS. 1 and 2.

Each of the first and second expandable elastic containers 152 and 153 is pressure-sealed in the same manner as in the first and second embodiments of FIGS. 1 and 2 and each is completely filled with liquid of minimum compressibility, as in said first and second embodiments. Each of the first and second elastic containers 152 and 153 is designed in the same manner as the elastic containers of the first and second embodiments of FIGS. 1 and 2 so that the volume of liquid therein, particularly in the areas 162 and 163 thereof, respectively, is maintained at a minimum and provides the same minimization of area as in said embodiment of FIGS. 1 and 2. The third pressure chamber 151 is also completely filled with the liquid which fills the first and second elastic containers 152 and 153.

A third partition 164 is formed by a narrow part of the housing portion 123 intermediate and spaced from the first and second partitions 144 and 146. The liquid passage or conduit 161 includes a third aperture formed through the third partition 164. The conduit directs liquid from either of the first and second elastic containers 152 and 153 to the other via the first, second and third apertures 145, 147 and 161.

A flow control device extends into the third aperture 161 and functions to control the cross-sectional area of said third aperture and therefore controls the flow of liquid through the said third aperture. The flow control device comprises a threaded control member 165 which is threadedly engaged in an internally threaded bore in the housing portion 123, which bore extends from outside said housing portion through the third aperture 161. The threaded member 165 has one tapered end which extends into the third aperture 161. The other end of the threaded member 165 extends to the outside of the housing portion 123, so that it is readily and facilely controlled manually from outside said housing portion.

The head 154 of the first elastic container 152 has an elongated cylindrical portion 166 extending toward the third partition 164. The head 157 of the second elastic container 153 has an elongated cylindrical portion 167 extending toward the third partition 164. A first spring 168 has one end affixed to the end of the portion 166 closest to the third partition 164. A second spring 169 has one end affixed to the end of the portion 167 closest to the third partition 164. A first sealing member 171 is mounted on the first spring 168 at the other end thereof and functions to seal the closer opening of the third aperture 161 when the head 154 is in a determined position. A second sealing member 172 is mounted on the second spring 169 at the other end thereof and functions to seal the closer opening of the third aperture 161 in a determined position of the head 157 of the second elastic container 153.

The signal device provides electrical signals in the same manner as in the first and second embodiments of FIGS. 1 and 2. The signal device of the third embodiment of FIG. 3 comprises a first winding support 173 positioned in the first elastic container 152 and having a plurality of electrical windings 174 mounted thereon. A second winding support 175 is positioned in the second elastic container 153 and has a plurality of electrical windings 176 mounted thereon. The windings 174 are connected to leads which are combined in a cable 177 which passes through the housing portion 123 to outside said housing portion via a pressure-tight seal 178. The windings 176 are connected to leads which are combined in a cable 179 which passes through the housing portion 123 to outside said housing portion via a pressure-tight seal 181. An electrical indicator and a source of electrical energy (FIGS. 6 and 7) are connected to selected windings 174 and selected windings 176, in the same general manner as in the first and second embodiments of FIGS. 1 and 2.

A first core 182 of substantially hollow cylindrical configuration is coaxially positioned around the portion 166 of the head 154 and is therefore axially movably positioned in the first winding support 173. A second core 183 of substantially hollow cylindrical configuration is axially positioned around the portion 167 of the head 157 and is therefore axially movably positioned in the second winding support 175. Each of the first and second cores 182 and 183 comprises a ferromagnetic material. The first and second cores 182 and 183 are spaced from each other and are affixed to the corresponding portions 166 and 167, respectively.

If the volume of liquid in the first and second elastic containers 152 and 153 expands, the heads 154 and 157 thereof move in directions away from each other and towards the housing portions 122 and 125, respectively. Such movements of the heads 154 and 157 cause each of the first and second cores 182 and 183 to move an equal distance in opposite directions, so that the electrical signals provided in the leads of the cables 177 and 179 cancel each other out and there is no electrical indication of a pressure difference between the first and second pressure chambers 128 and 129. In the opposite situation, in which the heads 154 and 157 move toward each other and away from the housing portions 122 and 125 due to a decrease in volume of the liquid in the first and second elastic containers 152 and 153, the first and second cores 182 and 183 are moved toward each other in opposite directions by equal distances, so that the electrical signals in the cables 177 and 179 again cancel each other out and there is no indication of a pressure difference provided by the electrical indicator (FIG. 6).

The first core 182, the first winding support 173 and the electrical windings 174 together function as a first linearly transmitting differential transformer to produce in the leads of the cable 177 an alternating voltage electrical signal having an amplitude which is proportional to the position of said first core in said first winding support. The second core 183, the second winding support 175 and the electrical windings 176 together function as a second linearly transmitting differential transformer in a similar manner. The first and second elastic containers 152 and 153 and their retention springs are dimensioned and selected in the same manner as in the first and second embodiments of FIGS. 1 and 2, so that their heads 154 and 157 move equal distances under equal pressures.

The first and second sealing members 171 and 172 function as a safety device in the event of excess pressure and prevent the damage or destruction of either or both of the sensitive first and second expandable elastic containers 152 and 153 when the pressure in either or both of the first and second pressure chambers 128 and 129 becomes excessive. Thus, when the pressure in one of the first and second pressure chambers 128 and 129 becomes excessive, one of the sealing members 171 and 172 closes the corresponding opening of the third aperture 161, thereby preventing the flow of liquid from the corresponding one of the elastic containers 152 and 153 to the other. This causes the pressure of the liquid in the corresponding elastic container to increase in proportion to the pressure of the liquid in the pressure chamber in which such elastic container is positioned, thereby preventing non-elastic deformation of said elastic container.

When the pressure in one of the first and second pressure chambers 128 and 129 of the third embodiment of FIG. 3 varies to a different extent than that in the other of said pressure chambers, the heads 154 and 157 are both moved in the same direction, so that both cores 182 and 183 are moved in such direction with said heads. Under such circumstances, the electrical signals provided in the leads of the cables 177 and 179, when combined, provide an electrical signal which has an amplitude corresponding to the difference in pressure between the first and second pressure chambers 128 and 129.

Figure 4:
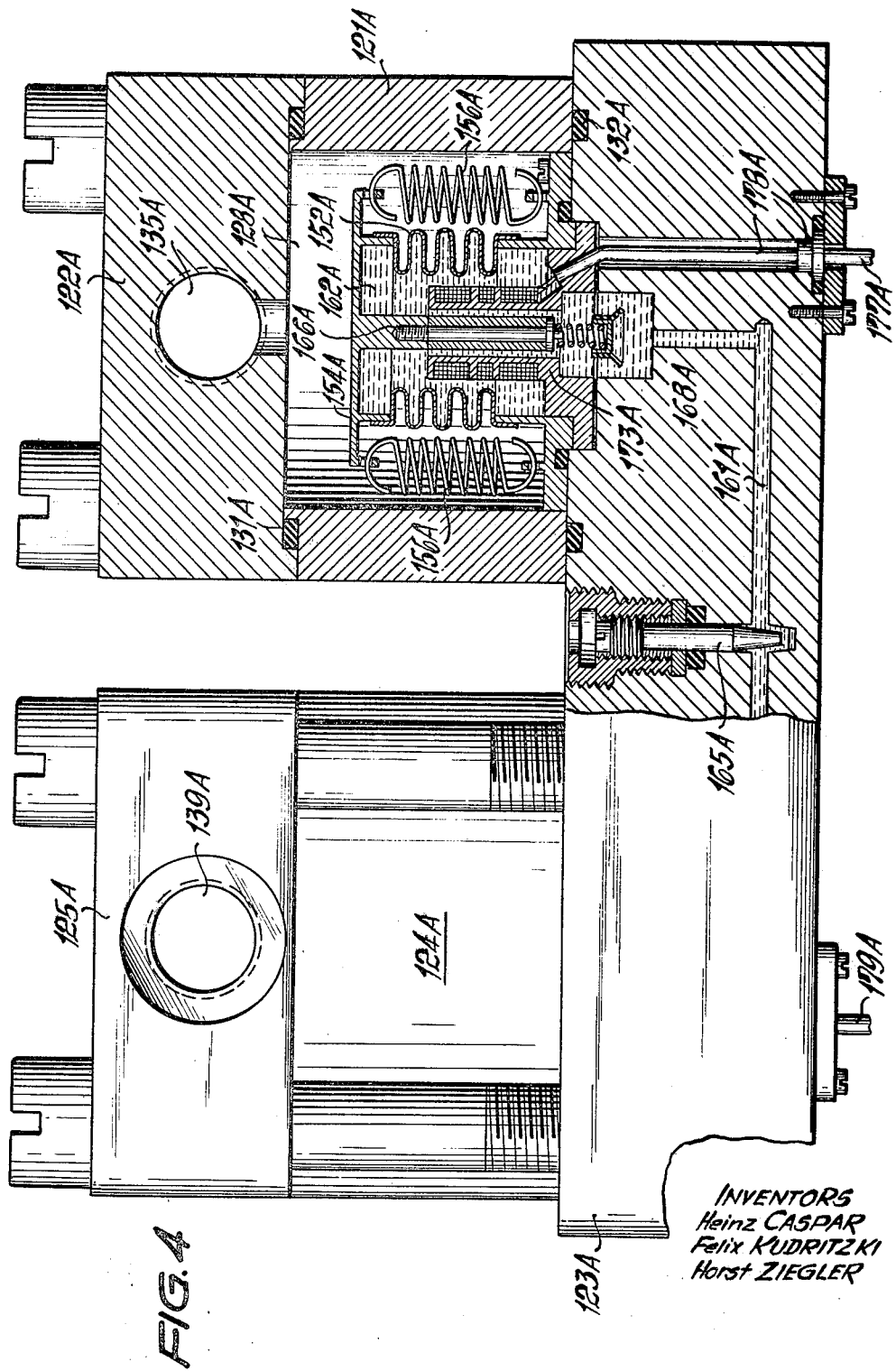
FIG. 4 is a cutaway view, partly in section, of a fourth embodiment of the apparatus of the present invention.

FIG. 6 discloses the electrical circuit for the signal device of the third embodiment of the present invention, as shown in FIG. 3, and for the fourth embodiment of the present invention, as shown in FIG. 4. In FIG. 6, a winding 174a of the windings 174 (FIG. 3) is provided with electrical energy from a source 191 of alternating voltage. The winding 174a is connected to the source 191 via leads 192, 193, 194 and 195, and a variable resistor 196 connected in the lead 193. A winding 176a of the windings 176 (FIG. 3) is provided with electrical energy from the source 191 of alternating voltage via the leads 192 and 195, leads 197 and 198, and a variable resistor 199 connected in the lead 197.

Windings 174b and 174c of the windings 174 are connected via the circuit to an electrical indicator 201. Windings 176b and 176c of the windings 176 are connected, via the circuit, to the electrical indicator 201. The electrical indicator 201 may comprise any suitable measuring instrument such as, for example, an ammeter. The windings 174b and 174c are connected with opposite polarities, as are the windings 176b and 176c. The windings 174b and 174c are connected to the inputs of a first rectifier 202. The windings 176b and 176c are connected to the inputs of a second rectifier 203.

The rectified output voltages of the windings 174b and 174c are algebraically combined in the rectifier 202 and the difference between such voltages is provided across resistors 204 and 205 of said rectifier. The rectified output voltages of windings 176b and 176c are algebraically combined in the rectifier 203 and the difference between such voltages is provided across resistors 206 and 207 of said rectifier. The output voltage of the rectifier 202, which is thus the difference in voltage between the windings 174b and 174c, is applied to corresponding inputs of an amplifier 208 via leads 209 and 211. The output voltage of the rectifier 203, which is thus the difference in voltage between the windings 176b and 176c, is applied to corresponding inputs of the amplifier 208 via leads 212 and 213.

The amplifier 208 includes an input stage 214 to which the output voltages of the rectifiers 202 and 203 are applied. The input stage 214 comprises any known suitable circuitry for providing the difference between the output voltage of the first rectifier 202 and the output voltage of the second rectifier 203. The amplifier 208 amplifies the difference voltage provided by its input stage 214 and produces an output which is a direct current which varies in amplitude in accordance with the difference between its two input voltages. The output current of the amplifier 208 is supplied to the inputs of a computer circuit 215 via leads 216 and 217. The computer circuit 215 functions to derive the square root of the output current of the amplifier 208 and produces an output signal or current which varies in proportion to the square root of the current supplied to its input. The output current of the computer circuit 215 is supplied to the electrical indicator or ammeter 201 via a lead 218.

The computer circuit 215 of FIG. 6 may comprise any suitable circuit for providing an output current which is the square root of its input current. In FIG. 6, the computer circuit comprises a transistor 219 having a base electrode which is connected to one of the inputs via a lead 221, a resistor 222 and a source of DC voltage 223. The base electrode of the transistor 219 is connected to the other input via the lead 221, a first diode 224 and a second diode 225. The input leads are short-circuited via a shunt connection 226. The emitter electrode of the transistor 219 is connected to the input 217 via a third diode 227 and a lead 228 and is connected to one input of an amplifier 229 via a lead 231, a source of DC voltage 232 and a lead 233. The collector electrode of the transistor 219 is connected to the other input of the amplifier 229 via a lead 234. A resistor 235 is connected across the inputs of the amplifier 229.

The embodiment of FIG. 3 functions to indicate the volume of fluid or liquid flowing through the pipe (not shown in the FIGURES) as a result of its indication of a difference in pressure between the pressure chambers. The electrical indicator 201 (FIG. 6) provides an indication which corresponds to the volumn of fluid or liquid flowing through the pipe (not shown in the figures) per unit time. The damping of the indication of the electrical indicator 201 (FIG. 3) is adjustable by axial rotation of the control member 165 of the flow control device (FIG. 3).

Apparatus of the type of the present invention is susceptible to shock and vibration to the extent that the indications provided by such apparatus are inaccurate. Even lesser accelerating forces produce inaccuracies in the indication provided by the apparatus. The inaccuracies are caused by the effect of the external forces upon the apparatus and by the corresponding inertia. The components of such external forces which correspond in direction with the moving components of the apparatus produce a shift in the movement of such components of the apparatus and thereby result in a false indication of a pressure difference. Furthermore, the position of the apparatus relative to vertical affects the indications provided by the apparatus. This is due to the weight of the components of the apparatus, since such weight is not negligible, and due to the weight of the structure of the apparatus as well as the weight of the liquid which is used to fill some of the components of the apparatus. These shortcomings prevent known apparatus from being used on moving vehicles such as, for example, seagoing vessels or any type of craft which provides a relatively unsteady platform.

The fourth embodiment of the present invention, shown in FIG. 4, overcomes the aforementioned disadvantages of the known apparatus. The indications provided by the fourth embodiment of FIG. 4 are almost completely free from the influence of external forces. The embodiment of FIG. 4 is essentially the same as the embodiment of FIG. 3, except that in FIG. 4, the first elastic container 152A and the second elastic container (not shown in FIG. 4) are mounted in a manner whereby they are freely expandable in the same direction and are freely contractible in the same direction. The first and second elastic containers are thus mounted in parallel spaced relation to each other.

In FIG. 4, the corresponding components of the third embodiment of FIG. 3 are indicated by the same reference numerals with an A added thereto, and only the first pressure chamber 128A and its corresponding components, as well as half the base plate, are shown. In the embodiment of FIG. 4, external forces such as, for example, inertia, affect the first and second elastic containers by moving their corresponding movable parts or heads in the same direction, so that such forces do not affect the difference in motion between the heads of said first and second elastic containers. The external forces thus do not vary the indication provided by the electrical indicator (FIG. 6) and such indication is accurate.

The effect on the indication provided by the embodiment of FIG. 4 of any inclination to vertical is negligible. This is due to the fact that the weight of the components and the structure of the apparatus of FIG. 4 is compensated for by the liquid which is utilized as a filler in such apparatus. Since the weight of such components results in forces which are in the same direction as the motion or movement of the first and second expandable elastic containers, such weight components cancel each other out. The only influence of an inclination to vertical is due to the weight of the liquid which is utilized as a filler and is dependent upon the distance of movement of the elastic containers from each other, as well as the degree of inclination to vertical. It is therefore preferable to maintain the distance of movement of the first and second elastic containers relative to each other as small as possible and to maintain the volume of liquid in each of the first and second elastic containers as small as possible by providing correspondingly small areas in said elastic containers for the accommodation of said liquid.

Although, in the embodiment of FIG. 4, the first and second expandable elastic containers are positioned in parallel spaced relation, they may be coaxially positioned and spaced axially. It is preferred, however, to mount the first and second elastic containers on a common base plate 123A which corresponds to the housing portion 123 of the third embodiment of FIG. 3. In FIG. 4, the first pressure chamber 128A is formed by the housing portions 121A, 122A and 123A. The second pressure chamber (not shown in FIG. 4) is formed by the housing portions 124A, 123A and 125A. Each of the housing portions 121A, 124A, 122A and 125A is positioned on the same side or surface of the common base plate 123A.

When the embodiment of FIG. 4 is subjected to external accelerating forces, forces of inertia act upon the expendable elastic containers, the heads of said containers and the retention or retaining springs of said containers, as aforementioned. Although these forces cause deflection of the aforementioned components from their rest positions, the deflections are always in the same direction or in the same sense so that the indications provided by the electrical indicator are not affected by such deflections. For the same reasons, inclination of the apparatus to vertical does not affect the indications provided by the electrical indicator (FIG. 6).

Figure 5:
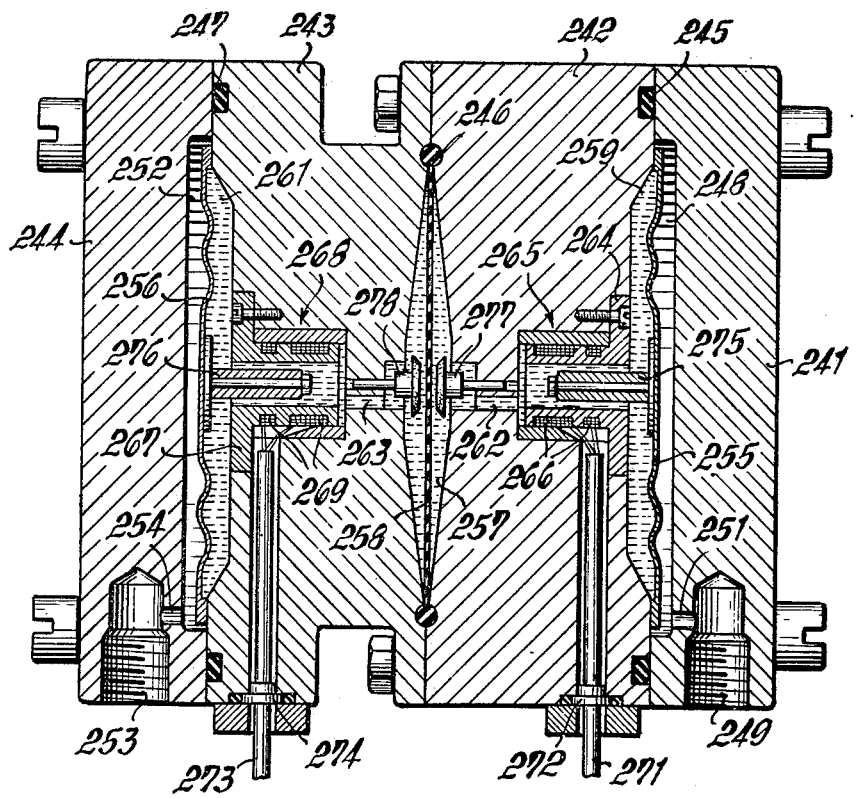
FIG. 5 is a view, partly in section, of a fifth embodiment of the apparatus of the present invention.

The fifth embodiment of the present invention is shown in FIG. 5 and comprises a first housing portion 241, a second housing portion 242, a third housing porton 243 and a fourth housing portion 244. Each of the housing portions 241, 242, 243 and 244 is of substantially cylindrical configuration. The housing portions 241, 242, 243 and 244 are affixed to each other in adjacent pressure-tight relation by any suitable means such as, for example, a plurality of bolts. The pressure-tight seals between the housing portions 241 and 242 are provided with the assistance of a sealing ring 245 of any suitable sealing material such as, for example, rubber. The pressure-tight seal between the housing portions 242 and 243 is provided with the assistance of a sealing ring 246 similar to the ring 245. The pressure-tight seal between the housing portions 243 and 244 is provided with the assistance of a sealing ring 247 which is similar to the sealing rings 245 and 246.

The housing portions 241 and 242 form between them a first pressure chamber 248. The pipe (not shown in the figures) is coupled to the first pressure chamber via a conduit 249, 251. The housing portions 244 and 243 form a second pressure chamber 252 between them. The second pressure chamber 252 is coupled to the pipe (not shown in the figures) via a conduit 253, 254. A first flexible or movable wall or metal diaphragm 255 is mounted in the first pressure chamber 248. A second flexible or movable wall or metal diaphragm 256 is mounted in the second pressure chamber 252.

The housing portions 242 and 243 form between them a third pressure chamber 257 which is intermediate and spaced from the first and second diaphragms 255 and 256. A third flexible or movable wall or diaphragm 258 is positioned in the third pressure chamber 257 parallel to and equidistantly spaced from the first and second diaphragms 255 and 256. The third diaphragm 258 is of any suitable flexible or yieldable material such as, for example, rubber.

The first and second diaphragms 255 and 256 thus replace and function as the first and second elastic containers of the previously described embodiments of the invention and are freely expandable in directly opposite directions away from each other and in directly opposite directions toward each other. The first diaphragm 255 is welded to the housing portion 242 in order to ensure a pressure-tight sealing of the first pressure chamber 248. The second diaphragm 256 is welded to the housing portion 243 in order to provide a pressure-tight sealing of the second pressure chamber 252.

A first area 259 of the housing portion 242, which is enclosed by the first diaphragm 255, is filled with a first volume of a suitable liquid such as, for example, water. A second area 261 of the housing portion 243, which is covered by the second diaphragm 256, is fileld with a second volume of liquid. The third diaphragm 258 is surrounded by the sealing ring 246, which borders the periphery of said third diaphragm and prevents the liquid in either of the areas 259 and 261 from entering the other of said areas. A first bore or conduit 262 is formed in the housing portion 242 and a second bore or conduit 263 is formed in the housing portion 243. Each of the first and second conduits 262 and 263 is widened or enlarged in its area adjacent the third pressure chamber 257.

The signal device of the fifth embodiment of FIG. 5 comprises a first winding support 264 positioned in a first recess 265 formed in the housing portion 242 and having a plurality of electrical windings 266 mounted thereon. A second winding support 267 is positioned in a second recess 268 formed in the housing portion 243 and has a plurality of electrical windings 269 mounted thereon. The leads from the windings 266 are combined in a cable 271 and are passed through the housing portion 242 to outside said housing portion via a pressure-tight seal 272. The leads from the windings 269 are combined in a cable 273 and are passed through the housing portion 243 to outside said housing portion via a pressure-tight seal 274. As in the other embodiments of the present invention, an electrical indicator and a source of electrical energy (FIG. 7) are connected to selected ones of the windings 266 and to selected ones of the windings 269.

A first core 275 of ferromagnetic material is affixed to the first diaphragm 255 and extends toward the third diaphragm 258. A second core 276 of ferromagnetic material is affixed to the second diaphragm 256 and extends toward the third diaphragm 258. Each of the first and second cores 275 and 276 thus moves with its corresponding diaphragm 255 and 256, respectively. A first sealing member 277 is positioned in the first conduit 262 for free movement in the directions of movement of the first and second diaphragms 255 and 256. A second sealing member 278 is positioned in the second conduit 263 for free movement in the directions of the first and second diaphragms 255 and 256. The first and second sealing members 277 and 278 function as a safety device for excess pressure in the first or second pressure chambers 248 and 252, in the manner of the excess pressure protecting devices of the other embodiments of the present invention, to protect the first and second diaphragms 255 and 256 from damage or destruction due to such excess pressure, by sealing their respective conduits in determined pressure conditions.

The fifth embodiment of FIG. 5 functions to indicate a difference of pressure between the first and second pressure chambers 248 and 252. When there is a difference in pressure between the first and second pressure chambers 248 and 252, the diaphragm of that one of said pressure chambers which has a higher pressure is moved or deflected toward the third diaphragm 258, thereby shifting a corresponding volume of the liquid filling the area 259 or 261 between said diaphragm and the corresponding housing. Shifting of the liquid in the area 259 or 261 adjacent the diaphragm 255 or 256 causes the third diaphragm 258 to be deflected from its rest or zero position in the same direction. The third diaphragm 258 comprises a material which is more flexible or yieldable than it is elastic, so that said third diaphragm does not attempt to restore itself to its rest or zero position. Thus, due to the deflecting forces on the third diaphragm 258, said diaphragm remains in its deflected position and the volume of the area adjacent the other, or non-deflected one of the diaphragms 255 and 256, is varied, so that said non-deflected diaphragm is deflected in correspondence with the variation of volume of liquid in the area 259 or 261 adjacent thereto.

When the pressure in one of the first and second pressure chambers 248 and 252 changes considerably, so that it is extremely or excessively high, the third diaphragm 258 is deflected to the point where it adheres closely to the opposite side of the third pressure chamber 257. This prevents the further flow of liquid or water into or out of the third pressure chamber 257 and thereby avoids damage to or destruction of the first and second diaphragms 255 and 256.

FIG. 7 is the electrical circuit of the signal device of the fifth embodiment of FIG. 5. In FIG. 7, the windings 266 of FIG. 5 comprise a winding 266a and a winding 266b. The windings 269 of FIG. 5 comprise a winding 269a and a winding 269b. A source 281 of alternating voltage energizes the winding 266a via a lead 282, a lead 283, a lead 284, a lead 285 and a variable resistor 286 connected in the lead 285. The source of alternating voltage 281 energizes the winding 269a via the lead 282, a lead 287, the lead 288, the lead 285 and a variable resistor 289 connected in the lead 288.

The signals provided in the winding 266b are rectified in a first rectifier 291. The signals provided in the winding 269b are rectified in a second rectifier 292. The output of the first rectifier 291 and the output of the second rectifier 292 are applied to the inputs of the input stage 214' of the amplifier 208'. The amplifier 208' and its input stage 214' are the same as, and function in the same manner as, the amplifier 208 and its input stage 214 of FIG. 6. A circuit similar to the remainder of the circuit of FIG. 6 is connected to the outputs 216 and 217 of the amplifier 208' of FIG. 7 and functions in the same manner as the corresponding circuit of FIG. 6 to provide the same electrical indications.

In the apparatus of the present invention, each expandable elastic container projects or transforms its physical position into a corresponding electrical signal with the assistance of the signal device and the differential transformers thereof. The signal device is thus preferably selected so that the slope, rate of change, inclination of increments of the differential transformer characteristic is variable or adjustable. Thus, utilizing the third embodiment of FIG. 3 as an example, a consideration of FIG. 6, which is the circuit for the signal device of said third embodiment, indicates that the electrical signal in the leads 212 and 213 from the output of the second rectifier 203 to the inputs of the input stage 214 of the amplifier 208 corresponds to (6) $\quad V1 = (s1)(x1) + V01$ The electrical signal in the leads 209 and 211 from the output of the first rectifier 202 in FIG. 6 to the inputs of the input stage 214 of the amplifier 208 corresponds to (7) $\quad V2 = (s2)(x2) + V02$ wherein $x1$ is the coordinate of the physical position of the first core 166 (FIG. 3), $x2$ is the coordinate of the physical position of the second core 167 (FIG. 3), $s1$ is the rate of change, slope, increments, or inclination, of the first differential transformer 166, 173, 174 of FIG. 3, $s2$ is the rate of change, slope, increments, or inclination, of the second differential transformer 167, 175, 176 of FIG. 3, $V01$ is a constant control voltage at the input stage 214 of the amplifier 208, and $V02$ is a constant control voltage at the input stage 214 of the amplifier 208. The constant control voltages $V01$ and $V02$ may be varied or adjusted to zero.

If Equations 5, 6 and 7 are combined, the resultant equation is (8) $\quad \dfrac{s1F1}{CC1} = \dfrac{s2F2}{CC2}$ Equation 8 may be balanced by the selection of the slope, increments, inclination, or rate of change $s1$ and/or $s2$. Thus, despite the fact that Equation 5 may be unfulfilled, the difference in voltage $\Delta V$, which is equal to V1 minus V2, corresponds to and indicates the pressure difference $\Delta P$.

The currents supplied to the windings 174a and 176a of FIG. 6 from the voltage source 191 are therefore made adjustable via the variable resistors 196 and 199 (FIG. 6). The variable resistors 196 and 199 of FIG. 6 thus permit the variation or adjustment of the rates of change, increments, inclinations, or slopes $s1$ and $s2$ in accordance with Equation 8. Thus, when Equation 5 is not fulfilled, the retaining or retention springs of the third embodiment of FIG. 6 (155, 156, 158, 159, and so on) need not be exchanged during the adjustment of the apparatus of the present invention. On the contrary, the adjustment of the apparatus of the present invention may be accomplished by purely electrical means, thereby providing the considerable advantage of avoiding the necessity for the replacement of the retention springs.

Various changes and modifications may be made in the apparatus of the present invention. Thus, for example, the retaining, restoration or retention springs may be replaced by springs which apply forces in directions directly opposite to the directions of the forces applied by said retaining springs.

While the invention has been described by means of specific examples and in specific embodiments, we do not wish to be limited thereto, for obvious modifications will occur to those skilled in the art without departing from the spirit and scope of the invention.

We claim:

1. Apparatus for measuring a difference in pressure between sources of pressure, comprising
   housing means;
   first and second pressure chambers in said housing means each connected to said sources of pressure;

a third pressure chamber in said housing means between said first and second pressure chambers and spaced therefrom and completely filled with liquid;

a first movable wall between said first and third pressure chambers;

a second movable wall between said second and third pressure chambers, said first and second walls being movable in determined directions without obstruction and their positions relative to each other being variable in accordance with variation in the volume of liquid in said third pressure chamber;

first restoration spring means coupling said first movable wall to said housing for urging said first wall to a reference position;

second restoration spring means coupling said second movable wall to said housing for urging said second wall to a reference position;

partition means dividing said third pressure chamber into two parts each including a corresponding one of said first and second walls, said partition means having aperture means formed therethrough for a throttled flow of liquid between said two parts; and signal means coupled to said first and second walls including electrical circuit means for producing an electrical signal varying with the difference in pressure of said sources of pressure.

2. Apparatus as claimed in claim 1, wherein said signal means comprises a movable core having spaced opposite ends, spring means coupling one end of said core to said first movable wall and coupling the other end of said core to said second movable wall, and electrical winding means positioned in operative proximity with said core for producing an electrical signal which varies in accordance with the position of said core relative to said housing.

3. Apparatus as claimed in claim 1, wherein said signal means is positioned in said third pressure chamber.

4. Apparatus as claimed in claim 1, wherein said signal means comprises a first movable core affixed to said first movable wall, a second movable core affixed to said second movable wall, first electrical winding means positioned in operative proximity with said first core for producing a first electrical signal which varies in accordance with the position of said first core relative to said housing, second electrical winding means positioned in operative proximity with said second core for producing a second electrical signal which varies in accordance with the position of said second core relative to said housing, and electrical means electrically connected to said first and second winding means for producing an electrical signal which varies in accordance with the difference between said first and second electrical signals.

5. Apparatus for measuring a difference in pressure, comprising a first pressure chamber having conduit means for coupling to a pipe conducting a medium whose difference in pressure is to be measured;

a second pressure chamber having conduit means for coupling to said pipe;

partition means interposed between and separating said first and second pressure chambers, said partition means having an aperture formed therethrough;

a first expandable elastic container in said first pressure chamber sealing said first pressure chamber at the aperture through said partition means and having a movable part;

a second expandable elastic container in said second pressure chamber sealing said second pressure chamber at the aperture through said partition means and having a movable part, said first and second elastic containers being mounted in a manner whereby they are freely expandable and freely contractible in determined directions relative to each other and their movable parts are movable in determined directions relative to each other;

conduit means formed through said partition means and extending from and opening into each of said first and second elastic containers; and signal means for providing an electrical signal corresponding to a difference in position between said first and second elastic containers, said signal means being mechanically coupled to the movable part of each of said first and second elastic containers whereby variation of pressure on one of said first and second elastic containers moves said signal means in accordance with the difference in pressure in said first and second pressure chambers and movement of said sigial means produces a corresponding electrcal signal.

6. Apparatus as claimed in claim 5, wherein said first and second elastic containers are mounted in a manner whereby they are freely expandable in directly opposite directions away from each other and freely contractible in directly opposite directions toward each other.

7. Apparatus as claimed in claim 5, wherein said partition means comprises a first partition having a first aperture formed therethrough and a second partition spaced from said first partition and having a second aperture formed therethrough, said first and second partitions forming a third pressure chamber therebetween, said first partition separating said first and third pressure chambers and said first elastic container sealing said first pressure chamber at said first aperture and said second partition separating said second and third pressure chambers and said second elastic container sealing said second pressure chamber at said second aperture, and said signal means comprises a winding support positioned in said third pressure chamber and having electrical windings mounted thereon, electrical indicating means connected to selected ones of said windings, electrical energizing means connected to selected others of said windings, a core having spaced opposite ends axially movably positioned in said winding support, a lever arm having a center and spaced opposite ends pivotally mounted at its center at one end of said core, a first coupling rod affixed to and extending between one end of said lever arm and the movable part of said first elastic container and a second coupling rod affixed to and extending between the other end of said lever arm and the movable part of said second elastic container.

8. Apparatus as claimed in claim 5, wherein said partition means comprises a first partition having a first aperture formed therethrough and a second partition spaced from said first partition and having a second aperture formed therethrough, said first and second partitions forming a third pressure chamber therebetween, said first partition separating said first and third pressure chambers and said first elastic container sealing said first pressure chamber at said first aperture and said second partition separating said second and third pressure chambers and said second elastic container sealing said second pressure chamber at said second aperture, and said signal means comprises a winding support positioned in said third pressure chamber and having electrical windings mounted thereon, electrical indicating means connected to selected ones of said windings, electrical energizing means connected to selected others of said windings, a core having spaced opposite ends axially movably positioned in said winding support, and spring means coupling one end of said core to the movable part of said first elastic container and coupling the other end of said core to the moveable part of said second elastic container.

9. Apparatus as claimed in claim 8, wherein the spring means of said signal means comprises a first spring having one end affixed to one end of said core and another end affixed to the movable part of said first elastic container and a second spring having one end affixed to the other end of said core and another end affixed to the movable part of said second elastic container.

10. Apparatus as claimed in claim 8, further comprising a first coupling rod affixed at one end to one end of said core, a first sealing member mounted on said first coupling rod in the area of the other end thereof for sealing said first aperture in a determined position of said first coupling rod, a second coupling rod affixed at one end to the other end of said core and a second sealing member mounted on said second coupling rod in the area of the other end thereof for sealing said second aperture in a determined position of said second coupling rod, the spring means of said signal means comprising a first spring having one end affixed to the other end of said first coupling rod and another end affixed to the movable part of said first elastic container and a second spring having one end affixed to the other end of said second coupling rod and another end affixed to the movable part of said second elastic container.

11. Apparatus as claimed in claim 5, wherein said partition means comprises a first partition having a first aperture formed therethrough and a second partition spaced from said first partition and having a second aperture formed therethrough, said first elastic container sealing said first pressure chamber at said first aperture and said second elastic container sealing said second pressure chamber at said second aperture, and said signal means comprises linearly transmitting differential transformer means for providing electrical signals in accordance with the movement of the movable parts of said first and second elastic containers, said transformer means being mechanically coupled to the movable parts of said first and second elastic containers.

12. Apparatus as claimed in claim 11, wherein said transformer means comprises a first linearly transmitting differential transformer mechanically coupled to the movable part of said first elastic container and a second linearly transmitting differential transformer mechanically coupled to the movable part of said second elastic container.

13. Apparatus as claimed in claim 11, wherein said transformer means comprises a first linearly transmitting differential transformer mechanically coupled to the movable part of said first elastic container and positioned in said first elastic container and a second linearly transmitting differential transformer mechanically coupled to the movable part of said second elastic container and positioned in said second elastic container.

14. Apparatus as claimed in claim 11, further comprising conduit means between the first and second apertures of said first and second partitions and blocking means mechanically coupled to the movable parts of said first and second elastic containers for blocking said conduit means to prevent the passage of fluid between said first and second apertures in accordance with the movement of the movable parts of said first and second elastic containers.

15. Apparatus as claimed in claim 11, further comprising conduit means for directing a fluid from one of said first and second elastic containers to the other through said first and second apertures and flow control means in said conduit means for controlling the flow of fluid between said first and second elastic containers.

16. Apparatus as claimed in claim 5, wherein said partition means comprises a first partition having a first aperture formed therethrough and a second partition spaced from said first partition and having a second aperture formed therethrough, said first elastic container sealing said first pressure chamber at said first aperture and said second elastic container sealing said second pressure chamber at said second aperture, and said signal means comprises a first winding support positioned in said first elastic container and having electrical windings mounted thereon and a second winding support positioned in said second elastic container and having electrical windings mounted thereon, electrical indicating means connected to selected ones of said windings, electrical energizing means connected to selected others of said windings, a first core having spaced opposite ends axially movably positioned in said first winding support and affixed at one end to the movable part of said first elastic container and a second core having spaced opposite ends axially movably positioned in said second winding support and affixed at one end to the movable part of said second elastic container, said first and second cores being spaced from each other.

17. Apparatus as claimed in claim 16, further comprising a third partition having a third aperture formed therethrough and positioned intermediate and spaced from said first and second partitions, conduit means for directing a fluid from one of said first and second elastic containers to the other through said first, second and third apertures and flow control means in said third aperture for controlling the cross-sectional area of and therefore the flow of fluid through said third aperture.

18. Apparatus as claimed in claim 16, further comprising a third partition having a third aperture formed therethrough and positioned intermediate and spaced from said first and second partitions, conduit means for directing a fluid from one of said first and second elastic containers to the other through said first, second and third apertures and flow control means in said third aperture for controlling the cross-sectional area of and therefore the flow of fluid through said third aperture, a first spring having one end affixed to the other end of said first core and another end, a first sealing member mounted on said first spring at the other end thereof for sealing one opening of said third aperture in a determined position of said first core, a second spring having one end affixed to the other end of said second core and another end, a second sealing member mounted on said second spring at the other end thereof for sealing the other opening of said third aperture in a determined position of said second core.

19. Apparatus as claimed in claim 16, further comprising a housing enclosing said apparatus, a third partition having a third aperture formed therethrough and positioned intermediate and spaced from said first and second partitions, conduit means for directing a fluid from one of said first and second elastic containers to the other through said first, second and third apertures and flow control means in said third aperture for controlling the cross-sectional area of and therefore the flow of fluid through said third aperture, said flow control means including a manually operable control member extending through said housing to outside said housing.

20. Apparatus as claimed in claim 5, wherein said first and second elastic containers are mounted in a manner whereby they are freely expandable in the same direction and freely contractible in the same direction.

21. Apparatus as claimed in claim 5, wherein said first and second elastic containers are mounted in parallel spaced relation to each other whereby they are freely expandable in the same direction and freely contractible in the same direction.

22. Apparatus as claimed in claim 21, wherein said signal means comprises linearly transmitting differential transformer means for providing electrical signals in accordance with the movement of the movable parts of said first and second elastic containers, said transformer means being mechanically coupled to the movable parts of said first and second elastic containers and further comprising a common base plate having conduit means formed therein for directing a fluid from one of said first and second elastic containers to the other, said conduit means having a first aperture at one end thereof and a second aperture at the other end thereof, said first elastic container sealing said first pressure chamber at said first aperture and said second elastic container sealing said second pressure chamber at said second aperture, flow control means in said conduit means for controlling the flow of fluid between said first and second elastic containers and blocking means mechanically coupled to the movable parts of said first and second elastic containers for blocking said conduit means to prevent the passage of fluid between said first and second elastic containers in accordance with the movement of the movable parts of said first and second elastic containers.

23. Apparatus as claimed in claim 5, wherein said first and second elastic containers are diaphragms mounted in a manner whereby they are freely expandable in directly opposite directions away from each other and freely contractible in directly opposite directions towards each other.

24. Apparatus as claimed in claim 5, wherein said first and second elastic containers are diaphragms mounted in a manner whereby they are freely expandable in directly opposite directions away from each other and freely contractible in directly opposite directions toward each other and further comprising a third pressure chamber intermediate and spaced from said diaphragms and a third diaphragm positioned in said third pressure chamber parallel to and spaced substantially equidistantly from said first-mentioned diaphragms.

25. Apparatus for measuring a difference in pressure between sources of pressure, comprising
    housing means;
    first and second pressure chambers in said housing means each connected by conduit means to a corresponding source of pressure;
    a first diaphragm sealing a first area of said first pressure chamber;
    a second diaphragm sealing a second area of said second pressure chamber, each of said first and second areas being filled completely with liquid;
    a movable wall positioned between and separating said first and second areas, said movable wall being movable under the influence of a pressure difference in said first and second pressure chambers;
    stopping means affixed to said housing means for stopping the motion of said movable wall at determined points; and
    signal means connected to each of said diaphragms for producing an electrical signal corresponding to the position of said diaphragms relative to said housing means, said signal means comprising electrical measuring means for producing an electrical measuring signal corresponding to the difference of position of said diaphragms.

References Cited

UNITED STATES PATENTS

| | | | |
|---|---|---|---|
| 2,627,183 | 2/1953 | Greenwood et al. | 73—398 XR |
| 3,225,600 | 12/1965 | Ziegler | 73—407 |

DONALD O. WOODIEL, Primary Examiner

U.S. Cl. X.R.

73—392, 398